(12) United States Patent
Yamagata

(10) Patent No.: US 7,433,109 B2
(45) Date of Patent: Oct. 7, 2008

(54) SCANNING OPTICAL SYSTEM AND SCANNING OPTICAL DEVICE

(75) Inventor: Naoki Yamagata, Tokyo (JP)

(73) Assignee: Hoya Corporation, Tokyo (JP)

( * ) Notice: Subject to any disclaimer, the term of this patent is extended or adjusted under 35 U.S.C. 154(b) by 0 days.

(21) Appl. No.: 11/956,554

(22) Filed: Dec. 14, 2007

(65) Prior Publication Data

US 2008/0144153 A1 Jun. 19, 2008

(30) Foreign Application Priority Data

Dec. 15, 2006 (JP) .............................. 2006-337757

(51) Int. Cl.
*G02B 26/08* (2006.01)
(52) U.S. Cl. .................. 359/205; 359/207; 359/213; 359/214; 359/215
(58) Field of Classification Search .................. None
See application file for complete search history.

(56) References Cited

U.S. PATENT DOCUMENTS

| 4,350,988 A | 9/1982 | Masegi |
| 4,378,562 A | 3/1983 | Oosaka |
| 2002/0163702 A1* | 11/2002 | Hori et al. .................. 359/204 |
| 2005/0168787 A1 | 8/2005 | Iizuka |
| 2006/0126147 A1 | 6/2006 | Takakubo |
| 2007/0081218 A1 | 4/2007 | Matsuoka |
| 2007/0091405 A1 | 4/2007 | Matsuoka |

FOREIGN PATENT DOCUMENTS

| JP | 54-49147 | 4/1979 |
| JP | 56-8110 | 1/1981 |
| JP | 2002-182147 | 6/2002 |

OTHER PUBLICATIONS

English language Abstract of JP 2002-182147.

* cited by examiner

*Primary Examiner*—James Phan
(74) *Attorney, Agent, or Firm*—Greenblum & Bernstein, P.L.C.

(57) ABSTRACT

There is provided a scanning optical system used with a deflection mirror that produces sinusoidal vibrations. The scanning optical system includes a first lens having a positive power, and a second lens having a negative power. In this configuration, the first lens and the second lens are arranged in this order from a deflection mirror side. Further, the scanning optical system has an arcsine property and satisfies a condition:

$$-1.15 < f1/f2 < -0.70 \qquad (1)$$

where f1 (mm) represents a focal length of the first lens, and f2 (mm) represents a focal length of the second lens.

9 Claims, 3 Drawing Sheets

LINEARITY
ERROR
[%]

CURVATURE
OF FIELD
[mm]

WAVEFRONT
ABERRATION
λ[rms]

LINEARITY
ERROR
[%]

CURVATURE
OF FIELD
[mm]

WAVEFRONT
ABERRATION
λ[rms]

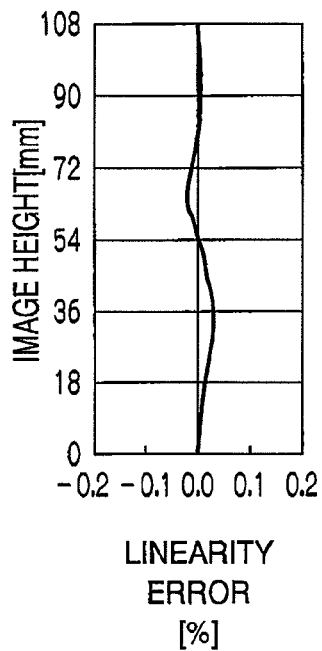 FIG.5A LINEARITY ERROR [%]
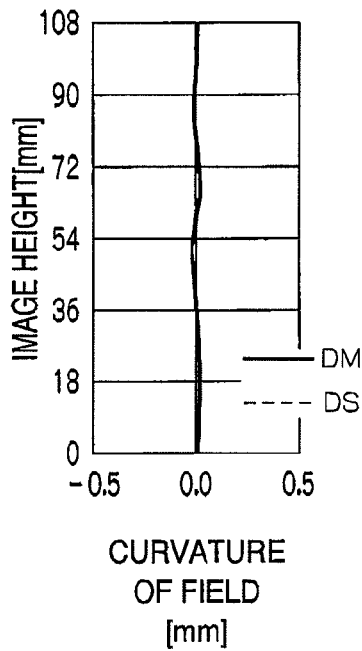 FIG.5B CURVATURE OF FIELD [mm]
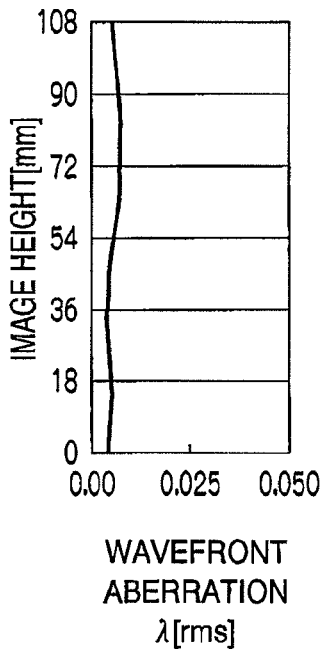 FIG.5C WAVEFRONT ABERRATION λ[rms]
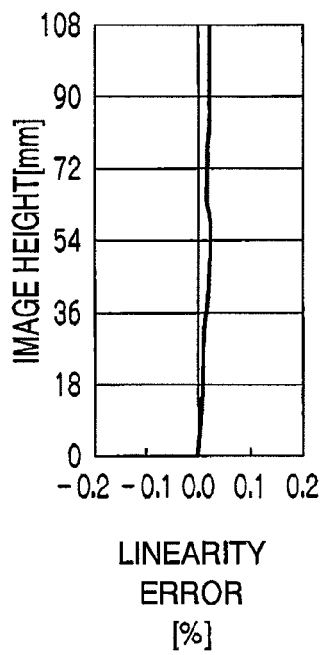 FIG.6A LINEARITY ERROR [%]
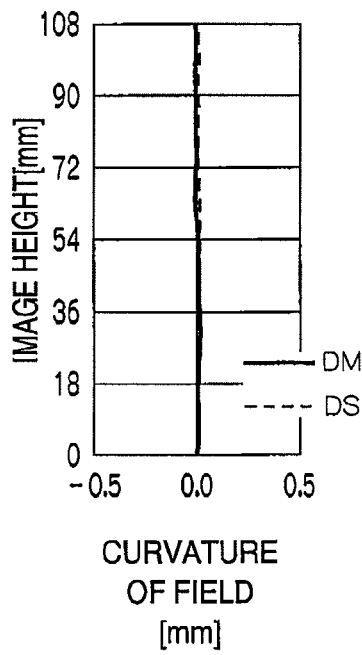 FIG.6B CURVATURE OF FIELD [mm]
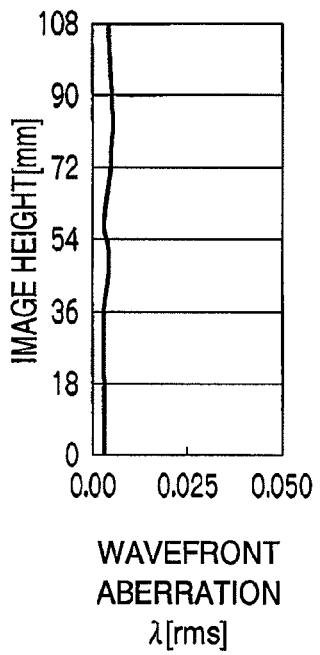 FIG.6C WAVEFRONT ABERRATION λ[rms]

SCANNING OPTICAL SYSTEM AND SCANNING OPTICAL DEVICE

BACKGROUND OF THE INVENTION

The present invention relates to a scanning optical device for scanning a laser beam by deflecting the laser beam with a deflection mirror, and particularly to a scanning optical system having a micro deflection mirror which functions as a deflector for deflecting the laser beam by producing sinusoidal vibrations.

In general, a scanning optical device for imaging devices such as a laser copying device or a laser printer is configured to deflect a laser beam emitted by a light source while on-off modulating the laser beam in synchronization with a modulating signal generated based on image data so that the laser beam scans on a drawing surface in a predetermined scanning direction. The scanning optical device further moves the drawing surface in a direction perpendicular to the predetermined scanning direction of the laser beam so that a required image can be formed on the drawing surface. Hereafter, the predetermined scanning direction in which the laser beam scans on the drawing surface by deflection by the deflector is referred to as a main scanning direction, and the direction in which the drawing surface is moved perpendicularly to the main scanning direction is referred to as an auxiliary scanning direction.

In the above mentioned scanning optical device for imaging devices, a polygonal mirror having a plurality of mirror surfaces is employed as a deflector for deflecting the laser beam. Further, an fθ lens (or an fθ lens group) functioning as a scanning optical system is located on a rear side with respect to the polygonal mirror so that the laser beam scans on the drawing surface at a constant speed. However, such a scanning optical device needs to have a motor unit for rotating the polygonal mirror. Use of such a motor unit needs relatively large space in the scanning optical device, and thereby increases cost of the scanning optical device.

Japanese Patent Provisional Publication No. 2002-182147 (hereafter, referred to as JP2002-182147A) discloses a scanning optical device employing a micromirror device functioning as a deflector. By employing a micromirror device, cost reduction and downsizing of the scanning optical device can be achieved. Such a scanning optical device employing a micromirror device also needs use of a scanning optical system as in the case of the scanning optical device employing the polygonal mirror.

In the scanning optical device disclosed in JP2002-182147A, the micromirror device deflects an incident laser beam periodically by causing a mirror surface to produce sinusoidal vibrations around a predetermined axis. It is understood that if such a micromirror device is used to deflect the incident laser beam, the speed of a beam spot moving on the drawing surface varies such that the speed becomes slower at a point near to edges of a scanning range. Therefore, in this case, the scanning optical system needs to have, in place of an fθ property, an arcsine property where the amount of distortion becomes larger at a point closer to edges of the scanning optical system so that the speed of the beam spot can be kept constant within the entire scanning range.

In order to downsize a scanning optical device by employing a micromirror device, a scanning optical system also needs to be downsized. However, in general, the smaller the size of a scanning optical system becomes, the larger the amount of aberration becomes. Therefore, it is necessary to downsize a scanning optical system adapted for use with an existing galvanometer mirror which produces sinusoidal vibrations similarly to a micromirror device while keeping the amount of aberration such as a curvature of field in an acceptable range.

SUMMARY OF THE INVENTION

The present invention is advantageous in that it provides a scanning optical device configured to have a scanning optical system suitably used together with a micromirror device employed for the purpose of downsizing while keeping an excellent optical property.

According to an aspect of the invention, there is provided a scanning optical system used with a deflection mirror that produces sinusoidal vibrations. The scanning optical system includes a first lens having a positive power, and a second lens having a negative power. In this configuration, the first lens and the second lens are arranged in this order from a deflection mirror side. Further, the scanning optical system has an arcsine property and satisfies a condition:

$$-1.15 < f1/f2 < -0.70 \quad (1)$$

where f1 (mm) represents a focal length of the first lens, and f2 (mm) represents a focal length of the second lens.

Such a configuration makes it possible to achieve a scanning optical system suitably used with a deflection mirror producing sinusoidal vibrations while providing the scanning optical system with a function of suitably correcting various aberrations such as a curvature of field and achieving low cost.

In at least one aspect, the scanning optical system may satisfy a condition:

$$-8.00 < \frac{r1+r2}{r1-r2} - \frac{65.6D}{f} < -4.00 \quad (2)$$

where r1 (mm) represents a radius of curvature of a first surface of the first lens located on the deflection mirror side, r2 (mm) represents a radius of curvature of a second surface of the first lens located oppositely to the first surface, D (mm) represents a distance from a point at which a laser beam is incident on the deflection mirror to the first surface of the first lens, and f represents a total focal length of the scanning optical system.

In at least one aspect, the scanning optical system may satisfy a condition:

$$-4.20 < \frac{r3+r4}{r3-r4} < -1.20 \quad (3)$$

where r3 (mm) represents a radius of curvature of a first surface of the second lens located on the deflection mirror side, and r4 (mm) represents a radius of curvature of a second surface of the second lens located oppositely to the first surface.

In at least one aspect, the scanning optical system may satisfy a condition:

$$0.05 < s/f < 0.65 \quad (4)$$

where s (mm) represents a distance between two principal points of the scanning optical system.

In at least one aspect, at least one of surfaces of the first lens is an aspherical surface. In this case, the scanning optical system may satisfy a condition:

$$-4.7E-3 < \frac{ASP}{f1 \times \tan^2\omega \times D} < 1.0E-3 \quad (5)$$

where ASP (mm) represents a difference between SAG amounts of surfaces of the first lens, ω (degree) represents an angle of view of a laser beam incident on the first lens, and a notation E means a power of 10 with an exponent specified by a number to the right of E.

In at least one aspect, the scanning optical system satisfies a condition:

$$-0.42 < \frac{ASP}{\arcsin^2\omega \times D} < 0.02 \quad (6)$$

where ASP (mm) represents a difference between SAG amounts of surfaces of the first lens, and ω (degree) represents an angle of view of a laser beam incident on the first lens.

According to another aspect of the invention, there is provided a scanning optical device which includes a light source unit configured to emit a laser beam while on-off modulating the laser beam in accordance with a modulating signal generated based on image data, a deflection mirror that produces sinusoidal vibrations to deflect the laser beam emitted by the light source unit, one of the above mentioned scanning optical system, and a scan target unit configured such that a scan target surface on which the laser beam deflected by the deflection mirror scans in a scanning direction is moved perpendicularly to the scanning direction.

With this configuration, it is possible to suitably suppress various aberrations such as a curvature of field while maintaining an appropriate property of distortion for achieving a constant speed of a scanned beam.

In at leas t one aspect, the deflection mirror may include a micromirror.

BRIEF DESCRIPTION OF THE ACCOMPANYING DRAWINGS

FIG. 5A is a graph illustrating a linearity error caused on a scan target surface in the scanning optical device according to a third example.

FIG. 5B is a graph illustrating the curvature of field caused in the scanning optical device according to the third example.

FIG. 5C is a graph illustrating the wavefront aberration caused in the scanning optical device according to the third example.

FIG. 6A is a graph illustrating a linearity error caused on a scan target surface in the scanning optical device according to a fourth example.

FIG. 6B is a graph illustrating the curvature of field caused in the scanning optical device according to the fourth example.

FIG. 6C is a graph illustrating the wavefront aberration caused in the scanning optical device according to the fourth example.

DETAILED DESCRIPTION OF THE EMBODIMENTS

Hereinafter, an embodiment according to the invention is described with reference to the accompanying drawings.

Figure 1:
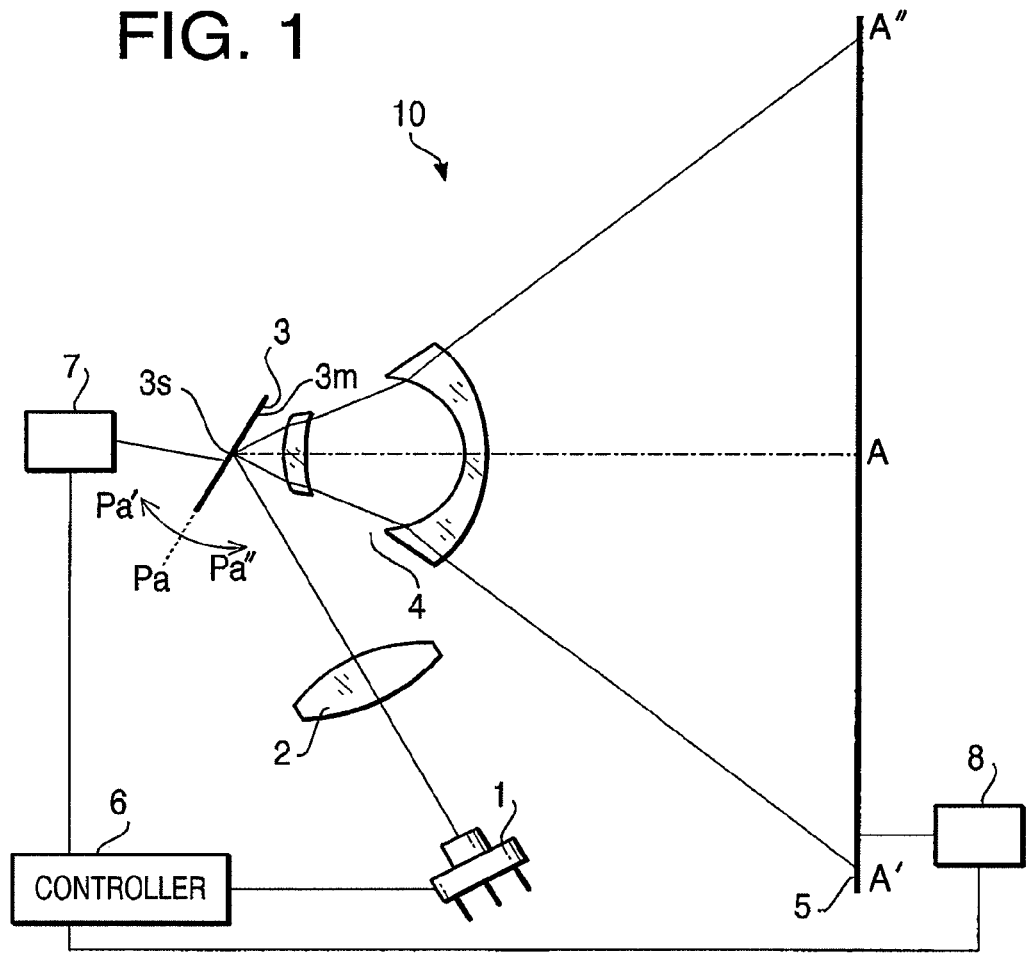
FIG. 1 is a block diagram of a scanning optical device having a scanning optical system according to an embodiment of the invention.

FIG. 1 is a block diagram of a scanning optical device 10 having a scanning optical system 4 according to an embodiment. FIG. 1 is illustrated as a cross section of the scanning optical device 10 including a plane (a main scanning plane) including a main scanning direction. As shown in FIG. 1, the scanning optical device 10 includes a light source 1, a condenser lens 2, a micromirror 3, the scanning optical system 4, a scan target surface 5, a controller 6, a mirror driving unit 7, and a surface driving unit 8. The controller 6 totally controls various processes described below as well as the various components in the scanning optical device 10.

When receiving externally a scan start instruction, the controller 6 generates a modulating signal for modulating a laser beam in accordance with image data. Then, the controller 6 modulates the laser beam emitted by the light source 1 in accordance with the modulating signal. As a result, the laser beam on-off modulated in accordance with the modulating signal is emitted from the light source 1.

The laser beam emitted from the light source 1 impinges on the micromirror 3 after passing through the condenser lens 2. Similarly to the function that a galvanometer mirror has, the micromirror 3 has a mirror surface 3m and a rotation axis 3s. The rotation axis 3s extends in an auxiliary scanning direction (i.e., a direction perpendicular to a drawing of FIG. 1). The mirror surface 3m is positioned such that the rotation axis 3s passes through the center of the mirror surface 3m. Under control of the controller 6, the mirror driving unit 7 drives the micromirror 3, and the micromirror 3 is vibrated around the rotation axis 3s such that a rotation angle and a time have a relationship corresponding to a sine curve. In other words, the micromirror 3 vibrates while keeping a relationship:

$R = \sin 2\pi(t/T)$ where R represents a rotation angle of the mirror surface 3m, t represents a time, and T represents a period of vibration. Hereafter, such a vibration is referred to as a sinusoidal vibration.

The laser beam impinges on the micromirror 3 at a point near to an axis passing through the center of the mirror surface 3m and extending in the auxiliary scanning direction. That is, the laser beam emitted by the light source 1 proceeds toward the rotation axis 3s. Then, the laser beam is deflected by the micromirror 3 at an angle corresponding to a rotation state of the micromirror 3, and thereafter is incident on the scan target surface 5 via the scanning optical system 4.

For example, if the mirror surface 3m is positioned at a position Pa shown in FIG. 1, the deflected laser beam proceeds along an optical axis of the scanning optical system 4, and is incident on an intermediate position A which is approximately equal to the center of a main scanning range A"-A' on the scan target surface 5. When the mirror surface 3m swings from the position Pa to a position Pa', the deflected laser beam moves from the intermediate position A to an edge position A' on the scan target surface 5. On the other hand, when the mirror surface 3m swings from the position Pa to a position Pa", the deflected laser beam moves from the intermediate position A to the other edge position A" on the scan target surface 5. Through repetitions of such sinusoidal vibrations of the micromirror 3, movements of the deflected laser beam on the scan target surface are produced continuously. Scanning of the laser beam on the scan target surface is thus achieved.

Under control of the control unit 6, the surface driving unit 8 drives the scan target surface 6 such that the scan target surface 6 moves in the auxiliary scanning direction at predetermined timings. By the above mentioned configuration, a two dimensional scanning of the laser beam can be achieved on the scan target surface 5.

Figure 2:
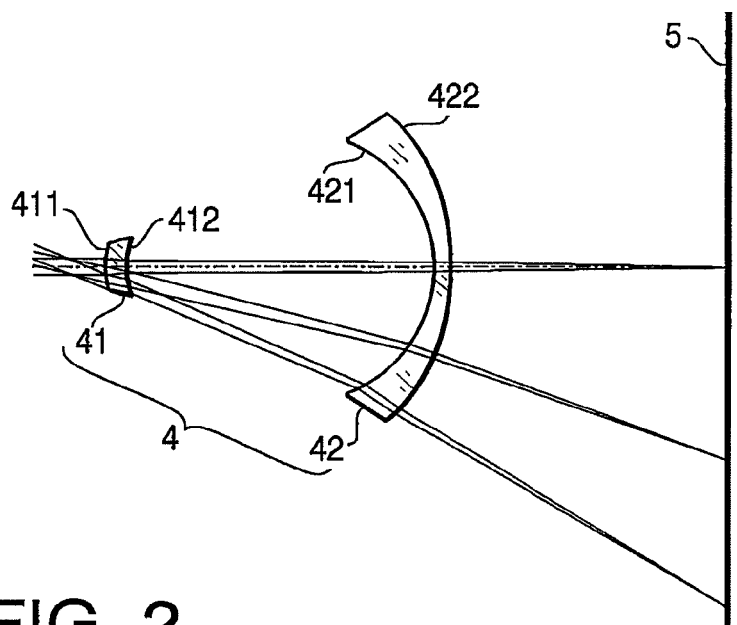
FIG. 2 is an enlarged view of the scanning optical system.

FIG. 2 is an enlarged view of the scanning optical system 4. FIG. 2 is illustrated as a cross section of the scanning optical system 4 including the main scanning plane. As shown in FIG. 2, the scanning optical system 4 is formed of two lenses including a first lens 41 and a second lens 42 arranged in this order from the light source side (i.e., the side on which the laser beam enters the scanning optical system 4). The first lens 41 has a positive power and the second lens 42 has a negative power. The first lens 41 has a first surface 411 and a second surface 412 arranged in this order from the incident surface side. The second lens 42 has a first surface 421 and a second surface 422 arranged in this order from the incident surface side.

As described above, if a micromirror is employed in a scanning optical device, a scanning optical system in the scanning optical device needs to have an arcsine property so that a constant speed of a scanning beam spot can be achieved on a scan target surface. In this embodiment, the scanning optical system 4 is provided with an arcsine property. More specifically, the scanning optical system 4 is configured to have positive distortion totally, and is configure such that an image height h (mm) is defined by an equation:

$$h = 2\phi_0 f \sin^{-1}\left(\frac{\theta}{2\phi_0}\right)$$

where f (mm) represents a focal length of the scanning optical system 4, $\phi_0$ (degree) represents a rotation angle (an amplitude) of the micromirror 3, and $\theta$ represents a deflection angle of the laser beam.

It should be noted that although JP2002-182147A describes the need for providing a scanning optical system in a scanning optical device having a micromirror device with an arcsine property, there is no disclosure in JP2002-182147A about a scanning optical system capable of suitably correcting aberrations, namely aberrations caused at high image heights, contributing to downsizing of the scanning optical device, and keeping an arcsine property.

In this embodiment, the scanning optical system 4 is configured as indicated below so that the scanning optical system 4 can suitably correct aberrations, namely aberrations caused at high image heights, contribute to downsizing of the scanning optical device 10, and keep an arcsine property.

The scanning optical system 4 is configured to satisfy a condition:

$$-1.15 < f1/f2 < -0.70 \tag{1}$$

where f1 (mm) represents a focal length of the first lens 41, and f2 (mm) represents a focal length of the second lens 42. The condition (1) relates to a ratio between focal lengths of the first and second lenses 41 and 42 forming the scanning optical system 44.

If f1/f2 gets smaller than or equal to the lower limit of the condition (1), a curvature of field in an under state is caused. If f1/f2 gets larger than or equal to the upper limit of the condition (1), a curvature of field in an over state is caused and the entire size of the scanning optical device 10 increases.

In order to improve the optical property of the scanning optical system 4, the first lens 41 may be configured to satisfy the following condition (2), and the second lens 42 may be configure to satisfy the following condition (3).

$$-8.00 < \frac{r1+r2}{r1-r2} - \frac{65.6D}{f} < -4.00 \tag{2}$$

$$-4.20 < \frac{r3+r4}{r3-r4} < -1.20 \tag{3}$$

In the condition (2), r1 (mm) represents a radius of curvature of the first surface 411 of the first lens 41, r2 (mm) represents a radius of curvature of the second surface 412 of the first lens 41, and D (mm) represents a distance from a point at which the laser beam is incident on the micromirror 3 to the first surface 411. In the condition (3), r3 (mm) represents a radius of curvature of the first surface 421 of the second lens 42, and r4 (mm) represents a radius of curvature of the second surface 442 of the second lens 42.

If the intermediate term of the condition (2) or (3) gets smaller than or equal to the lower limit, an astigmatism in an under state is caused in a meridional plane and an astigmatism in an over state is caused in a sagittal plane. If the intermediate term of condition (2) or (3) gets larger than or equal to the upper limit, an astigmatism in an over state is caused in a meridional plane and an astigmatism in an under state is caused in a sagittal plane. For this reason, the intermediate term of each of the conditions (2) and (3) needs to satisfy both of the lower limit and the upper limit. By satisfying at least one of the conditions (2) and (3), it is possible to improve the optical property of the scanning optical system 4.

The scanning optical system 4 may be configured to satisfy the following condition:

$$0.05 < s/f < 0.65 \tag{4}$$

where s (mm) represents a distance between a front principal point and a rear principal point of the scanning optical system 4. If s/f gets smaller than or equal to the lower limit of the condition (4), it becomes impossible to give a property of suitable positive distortion for achieving the arcsine property to the scanning optical system 4, and therefore the image forming performance may deteriorate particularly at high image heights. On the other hand, if s/f gets larger than or equal to the upper limit of the condition (4), it becomes difficult to downsize the scanning optical system 4.

At least one of surfaces of the first lens 41 may be configured to be an aspherical surface. A configuration of an aspherical surface can be expressed by the following expression:

$$X(h) = \frac{Ch^2}{1 + \sqrt{1 - (K+1)C^2 h^2}} + \sum_{i=2} A_{2i} h^{2i}$$

where X(h) denotes a SAG amount of a coordinate point on the aspherical surface whose height (distance) from the optical axis is h (SAG amount: distance measured from a tangential plane contacting the aspherical surface on the optical axis), "C" denotes the curvature (1/r) of the aspherical surface on the optical axis, "K" denotes a cone constant, and each "$A_{2i}$" (i: integer larger than 1) denotes an aspherical coefficient of the 2i-th order (the summation in the expression includes aspherical coefficients $A_4, A_6, A_8, A_{10}, A_{12}, \ldots$ of the fourth order, sixth order, eighth order, tenth order, twelfth order, and so forth).

If one of the surfaces of the first lens 41 is configured to be an aspherial surface, the aspherical surface is configured to satisfy a condition:

$$-4.7E - 3 < \frac{ASP}{f1 \times \tan^2 \omega \times D} < 1.0E - 3 \quad (5)$$

where ASP (mm) represents a difference between the SAG amount of the first surface 411 and the SAG amount of the second surface 412, and ω (degree) represents an angle of view of the laser beam incident on the first lens 41. The notation "E" means the power of 10 with an exponent specified by the number to the right of E (e.g. "E-04" means "$\times 10^{-4}$"). More specifically, when SAG amounts of the first surface 411 and the second surface 412 of the first lens 411 are represented as ASP1 and ASP2, respectively, ASP can be determined by the following equation.

$$ASP = ASP2 - ASP1$$

Each of the SAG amounts ASP1 and ASP2 means a SAG amount defined, at a height h from the optical axis, by a chief ray of the incident laser beam having an angle of view ω. Each of the SAG amounts ASP1 and ASP2 is negative in a direction proceeding from a tangential plane to the micromirror 3 and is positive in a direction proceeding from the tangential plane to the scan target surface.

If the value of the intermediate term of the condition (5) gets smaller than or equal to the lower limit of the condition (5), it becomes impossible to suitably correct the wavefront aberration, and the curvature of field in an under state is caused.

If the value of the intermediate term of the condition (5) gets larger than or equal to the upper limit of the condition (5), it becomes impossible to downsize the scanning optical system 4 and the entire size of the scanning optical device 10. Further, in this case a angle of view of the laser beam defined when the laser beam enters the scanning optical system 4 becomes small, and therefore the scanning range also becomes narrow.

The scanning optical system 4 may be configured to satisfy the following condition.

$$-0.42 < \frac{ASP}{\arcsin^2 \omega \times D} < 0.02 \quad (6)$$

If the value of the intermediate term of the condition (6) gets smaller than or equal to the lower limit of the condition (6), downsizing of the scanning optical system 4 can not be achieved, and therefore downsizing of the scanning optical system 10 can not be achieved. Further, in this case, the angle of view ω defined when the laser beam enters the scanning optical system 4 becomes small (i.e., the scanning range becomes small). If the value of the intermediate term of the condition (6) gets larger than or equal to the upper limit of the condition (6), it becomes impossible to suitably correct the wavefront aberration on the scan target surface 5, and therefore the large amount of curvature of field is caused. By satisfying the condition (6), occurrence of such problems can be avoided.

Hereafter four concrete examples of the scanning optical device 10 having the scanning optical system 4 are described. In each of these examples, the scanning optical system has the configuration shown in FIG. 2, the amplitude φ of the micromirror 3 is 20°, and the deflection angle θ of the laser beam is 30°.

FIRST EXAMPLE

Table 1 shows specifications of the scanning optical system 4 and the micromirror 3 according to a first example.

TABLE 1

| Surface No. | r | d | n |
|---|---|---|---|
| 1 | ∞ | 10.000 | |
| 2 | 27.272 | 6.000 | 1.486 |
| 3 | 52.011 | 73.831 | |
| 4 | −29.623 | 4.500 | 1.486 |
| 5 | −58.407 | 58.669 | |

In Table 1 (and in the following similar Tables), surface No. 1 represents the mirror surface 3m of the micromirror 3, surfaces Nos. 3 and 4 respectively represent the surfaces of the first lens 41, and surfaces Nos. 4 and 5 respectively represent the surfaces of the second lens 42. In Table 1, "r" denotes the curvature radius [mm] of each optical surface, "d" denotes the distance [mm] from each optical surface to the next optical surface, "n" denotes the refractive index of a medium between each optical surface and the next optical surface for a wavelength of 780 nm (ditto for the similar Tables explained later).

Each of the lens surfaces 411, 412, 421 and 422 (surfaces #2-#5) of the first and second lenses 41 and 42 forming the scanning optical system 4 is an aspherical surface. Table 2 shows the aspherical coefficients specifying the shape of each aspherical surface. The cone coefficient K is 0 for all of the aspherical surfaces.

TABLE 2

| Surface No. | A4 | A6 | A8 | A10 |
|---|---|---|---|---|
| 2 | 5.444E−05 | −2.357E−07 | 1.808E−09 | −7.509E−12 |
| 3 | 5.717E−05 | 1.171E−08 | 8.531E−11 | |
| 4 | −7.273E−06 | −3.073E−10 | 6.585E−13 | |
| 5 | −6.226E−06 | 2.243E−09 | −4.669E−13 | |

Table 3 shows values regarding the above mentioned conditions. As can be seen from Table 3, the values of the intermediate terms of the conditions (1), (2), (3) and (4) are −0.82, −6.79, −3.06 and 0.24, respectively. Therefore, the scanning optical device 10 according to the first example satisfies the conditions (1) to (4).

TABLE 3

| | |
|---|---|
| f | 182.41 |
| f1 | 109.27 |
| f2 | −132.69 |
| s | 43.47 |
| f1/f2 | −0.823 |
| (r1 + r2)/(r1 − r2) | −6.801 |
| (r3 + r4)/(r3 − r4) | −3.058 |
| s/f | 0.238 |

Table 4 shows values for evaluating the intermediate term of the condition (5). As can be seen from Table 4, the scanning optical system 4 satisfies the condition (5) within the range of the defined angle of view.

TABLE 4

| ω | ASP/(f1 × tan²ω × D) |
|---|---|
| 5 | −1.14E−04 |
| 10 | −1.09E−04 |
| 15 | −9.80E−05 |
| 20 | −8.67E−05 |
| 25 | −8.17E−05 |
| 30 | −9.43E−05 |

Figure 3A:
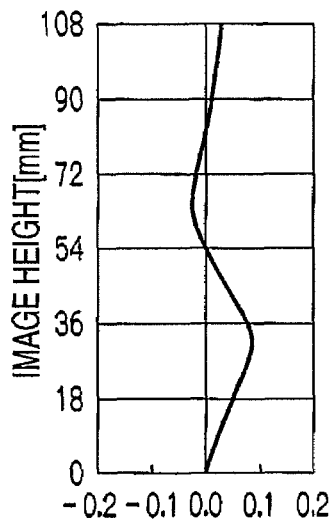
FIG. 3A is a graph illustrating a linearity error caused on a scan target surface in the scanning optical device according to a first example.
Figure 3B:
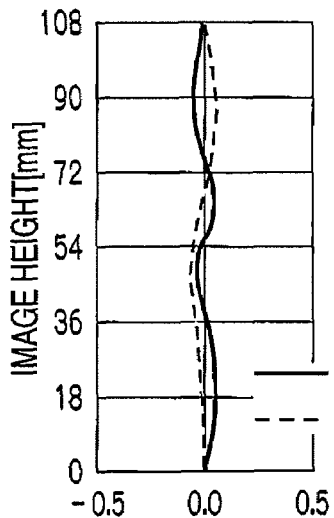
FIG. 3B is a graph illustrating the curvature of field caused in the scanning optical device according to the first example.
Figure 3C:
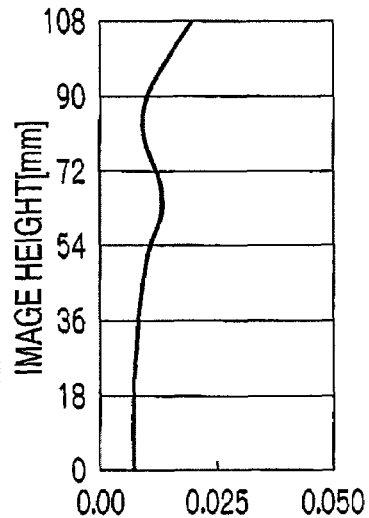
FIG. 3C is a graph illustrating the wavefront aberration caused in the scanning optical device according to the first example.

FIG. 3A is a graph illustrating a linearity error caused on the scan target surface 5 in the scanning optical device 10 according to the first example. FIG. 3B is a graph illustrating the curvature of field caused in the scanning optical device 10 according to the first example. FIG. 3C is a graph illustrating the wavefront aberration caused in the scanning optical device 10 according to the first example. In FIG. 3B (and in the following similar drawings), an image surface (DM) in the meridional plane is indicated by a solid line, and an image surface (DS) in the sagittal plane is indicated by a dashed line.

The scanning optical device 10 according to the first example satisfies the conditions (1) to (5). Therefore, as shown in FIGS. 3A to 3C, even if the micromirror 3 which produces sinusoidal vibrations is used as a deflector, the linearity error can be suppressed to a low level, and the aberrations can also be suitably suppressed. It is understood that the scanning optical system 4 is considerably downsized because the entire length of the scanning optical system 4 is 153 mm.

SECOND EXAMPLE

Table 5 shows specifications of the scanning optical system 4 and the micromirror 3 according to a second example.

TABLE 5

| Surface No. | r | d | n |
|---|---|---|---|
| 1 | ∞ | 10.000 | |
| 2 | 25.061 | 6.000 | 1.486 |
| 3 | 44.529 | 54.886 | |
| 4 | −42.160 | 6.000 | 1.486 |
| 5 | −219.771 | 71.245 | |

Each of the lens surfaces 411, 412, 421 and 422 (surfaces #2-#5) of the first and second lenses 41 and 42 forming the scanning optical system 4 is an aspherical surface. Table 6 shows the aspherical coefficients specifying the shape of each aspherical surface. The cone coefficient K is 0 for all of the aspherical surfaces.

TABLE 6

| Surface No. | A4 | A6 | A8 | A10 |
|---|---|---|---|---|
| 2 | 9.118E−05 | −8.328E−07 | 7.198E−09 | −2.671E−11 |
| 3 | 1.010E−04 | −3.013E−07 | 1.306E−09 | |
| 4 | −1.817E−06 | −7.853E−10 | 1.123E−12 | |
| 5 | −3.186E−06 | 1.226E−09 | −2.134E−13 | |

Table 7 shows values regarding the above mentioned conditions. As can be seen from Table 7, the values of the intermediate terms of the conditions (1), (2), (3) and (4) are −0.99, 7.13, −1.58 and 0.36, respectively. Therefore, the scanning optical device 10 according to the second example satisfies the conditions (1) to (4).

TABLE 7

| | |
|---|---|
| f | 182.41 |
| f1 | 107.10 |
| f2 | −108.50 |
| s | 65.19 |
| f1/f2 | −0.987 |
| (r1 + r2)/(r1 − r2) | −7.171 |
| (r3 + r4)/(r3 − r4) | −1.475 |
| s/f | 0.357 |

Table 8 shows values for evaluating the intermediate term of the condition (5). As can be seen from Table 8, the scanning optical system 4 satisfies the condition (5) within the range of the defined angle of view.

TABLE 8

| ω | ASP/(f1 × tan²ω × D) |
|---|---|
| 5 | −1.23E−05 |
| 10 | 6.83E−06 |
| 15 | 4.07E−05 |
| 20 | 7.59E−05 |
| 25 | 1.02E−04 |
| 30 | 9.59E−05 |

Figure 4A:
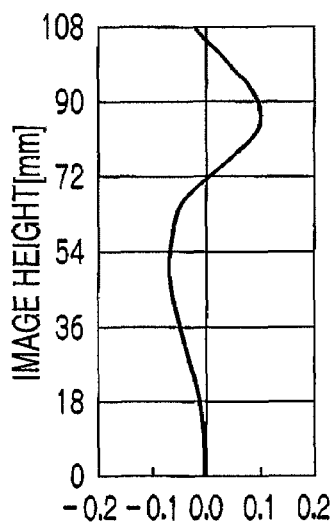
FIG. 4A is a graph illustrating a linearity error caused on a scan target surface in the scanning optical device according to a second example.
Figure 4B:
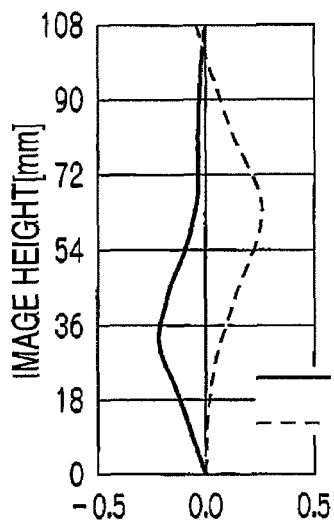
FIG. 4B is a graph illustrating the curvature of field caused in the scanning optical device according to the second example.
Figure 4C:
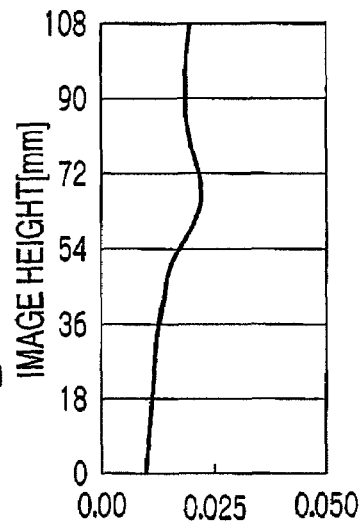
FIG. 4C is a graph illustrating the wavefront aberration caused in the scanning optical device according to the second example.

FIG. 4A is a graph illustrating a linearity error caused on the scan target surface 5 in the scanning optical device 10 according to the second example. FIG. 4B is a graph illustrating the curvature of field caused in the scanning optical device 10 according to the second example. FIG. 4C is a graph illustrating the wavefront aberration caused in the scanning optical device 10 according to the second example.

The scanning optical device 10 according to the second example satisfies the conditions (1) to (5). Therefore, as shown in FIGS. 4A to 4C, even if the micromirror 3 which produces sinusoidal vibrations is used as a deflector, the linearity error can be suppressed to a low level, and the aberrations can also be suitably suppressed. It is understood that the scanning optical system 4 is considerably downsized because the entire length of the scanning optical system 4 is approximately 148.13 mm.

THIRD EXAMPLE

Table 9 shows specifications of the scanning optical system 4 and the micromirror 3 according to a third example.

TABLE 9

| Surface No. | r | d | n |
|---|---|---|---|
| 1 | ∞ | 15.000 | |
| 2 | 268.575 | 6.000 | 1.486 |

TABLE 9-continued

| Surface No. | r | d | n |
|---|---|---|---|
| 3 | −64.141 | 63.065 | |
| 4 | −32.592 | 6.000 | 1.486 |
| 5 | −87.361 | 71.260 | |

Each of the lens surfaces 411, 412, 421 and 422 (surfaces #2-#5) of the first and second lenses 41 and 42 forming the scanning optical system 4 is an aspherical surface. Table 10 shows the aspherical coefficients specifying the shape of each aspherical surface. The cone coefficient K is 0 for all of the aspherical surfaces.

TABLE 10

| Surface No. | A4 | A6 | A8 | A10 |
|---|---|---|---|---|
| 2 | 2.117E−05 | −8.771E−08 | 1.988E−10 | −2.699E−13 |
| 3 | 1.474E−05 | −3.066E−08 | −6.150E−12 | |
| 4 | −9.763E−07 | −1.550E−10 | 6.001E−14 | |
| 5 | −1.852E−06 | 3.393E−10 | −6.209E−14 | |

Table 11 shows values regarding the above mentioned conditions. As can be seen from Table 11, the values of the intermediate terms of the conditions (1), (2), (3) and (4) are −0.97, −6.79, −2.19 and 0.34, respectively. Therefore, the scanning optical device 10 according to the third example satisfies the conditions (1) to (4).

TABLE 11

| | |
|---|---|
| f | 182.41 |
| f1 | 107.13 |
| f2 | −110.91 |
| s | 61.55 |
| f1/f2 | −0.966 |
| (r1 + r2)/(r1 − r2) | −4.780 |
| (r3 + r4)/(r3 − r4) | −2.190 |
| s/f | 0.337 |

Table 12 shows values for evaluating the intermediate term of the condition (5). As can be seen from Table 12, the scanning optical system 4 satisfies the condition (5) within the range of the defined angle of view.

TABLE 12

| ω | ASP/(f1 × tan²ω × D) |
|---|---|
| 5 | −1.99E−03 |
| 10 | −1.97E−03 |
| 15 | −1.93E−03 |
| 20 | −1.88E−03 |
| 25 | −1.83E−03 |
| 30 | −1.79E−03 |

FIG. 5A is a graph illustrating a linearity error caused on the scan target surface 5 in the scanning optical device 10 according to the third example. FIG. 5B is a graph illustrating the curvature of field caused in the scanning optical device 10 according to the third example. FIG. 5C is a graph illustrating the wavefront aberration caused in the scanning optical device 10 according to the third example.

The scanning optical device 10 according to the third example satisfies the conditions (1) to (5). Therefore, as shown in FIGS. 5A to 5C, even if the micromirror 3 which produces sinusoidal vibrations is used as a deflector, the linearity error can be suppressed to a low level, and the aberrations can also be suitably suppressed. It is understood that the scanning optical system 4 is considerably downsized because the entire length of the scanning optical system 4 is approximately 161.32 mm.

FOURTH EXAMPLE

Table 13 shows specifications of the scanning optical system 4 and the micromirror 3 according to a third example.

TABLE 13

| Surface No. | r | d | n |
|---|---|---|---|
| 1 | ∞ | 20.000 | |
| 2 | 156.994 | 6.000 | 1.486 |
| 3 | −72.517 | 57.942 | |
| 4 | −31.651 | 6.000 | 1.486 |
| 5 | −87.570 | 75.075 | |

Each of the lens surfaces 411, 412, 421 and 422 (surfaces #2-#5) of the first and second lenses 41 and 42 forming the scanning optical system 4 is an aspherical surface. Table 14 shows the aspherical coefficients specifying the shape of each aspherical surface. The cone coefficient K is 0 for all of the aspherical surfaces.

TABLE 14

| Surface No. | A4 | A6 | A8 | A10 |
|---|---|---|---|---|
| 2 | 1.558E−05 | −2.682E−08 | 2.629E−11 | −1.585E−14 |
| 3 | 1.196E−05 | −8.020E−09 | −8.362E−12 | |
| 4 | −1.605E−08 | −4.451E−10 | −1.193E−13 | |
| 5 | −1.142E−06 | −1.154E−10 | 5.579E−14 | |

Table 15 shows values regarding the above mentioned conditions. As can be seen from Tables 13 and 15, the values of the intermediate terms of the conditions (1), (2), (3) and (4) are −0.97, −6.79, −2.13 and 0.33, respectively. Therefore, the scanning optical device 10 according to the fourth example satisfies the conditions (1) to (4).

TABLE 15

| | |
|---|---|
| f | 182.41 |
| f1 | 102.91 |
| f2 | −105.66 |
| s | 57.98 |
| f1/f2 | −0.974 |
| (r1 + r2)/(r1 − r2) | −6.824 |
| (r3 + r4)/(r3 − r4) | −2.132 |
| s/f | 0.318 |

Table 16 shows values for evaluating the intermediate term of the condition (5). As can be seen from Table 16, the scanning optical system 4 satisfies the condition (5) within the range of the defined angle of view.

TABLE 16

| ω | ASP/(f1 × tan²ω × D) |
|---|---|
| 5 | −2.51E−03 |
| 10 | −2.48E−03 |
| 15 | −2.44E−03 |
| 20 | −2.40E−03 |
| 25 | −2.36E−03 |
| 30 | −2.34E−03 |

FIG. 6A is a graph illustrating a linearity error caused on the scan target surface 5 in the scanning optical device 10 according to the fourth example. FIG. 6B is a graph illustrating the curvature of field caused in the scanning optical device 10 according to the fourth example. FIG. 6C is a graph illustrating the wavefront aberration caused in the scanning optical device 10 according to the fourth example.

The scanning optical device 10 according to the fourth example satisfies the conditions (1) to (5). Therefore, as shown in FIGS. 6A to 6C, even if the micromirror 3 which produces sinusoidal vibrations is used as a deflector, the linearity error can be suppressed to a low level, and the aberrations can also be suitably suppressed. It is understood that the scanning optical system 4 is considerably downsized because the entire length of the scanning optical system 4 is approximately 161.02 mm.

Table 17 shows values for evaluating the intermediate term of the condition (6) for each of the first to fourth examples. As shown in Table 17, each of the scanning optical systems according to the first to fourth examples satisfies the condition (6) within the defined angle of view of the laser beam entering the scanning optical system 4. Therefore, the scanning optical device according to each of the first to fourth examples is able to suitably suppress the aberrations and to achieve the sufficiently wide scanning range while achieving the downsizing of the scanning optical system and the scanning optical device.

TABLE 17

| ω  | 1st EXAMPLE | 2nd EXAMPLE | 3rd EXAMPLE | 4th EXAMPLE |
|----|-------------|-------------|-------------|-------------|
| 5  | −0.01       | 0.00        | −0.21       | −0.26       |
| 10 | −0.01       | 0.00        | −0.21       | −0.26       |
| 15 | −0.01       | 0.00        | −0.21       | −0.26       |
| 20 | −0.01       | 0.01        | −0.21       | −0.26       |
| 25 | −0.01       | 0.01        | −0.21       | −0.26       |
| 30 | −0.01       | 0.01        | −0.21       | −0.26       |

Although the present invention has been described in considerable detail with reference to certain preferred embodiments thereof, other embodiments are possible.

In the above mentioned embodiment, a micromirror is employed as a deflector. However, even if a mirror unit configured to produce sinusoidal vibrations other than a micromirror may be employed in the above mentioned optical scanning device, the above mentioned excellent optical property can also be achieved.

In the above mentioned embodiment, the scanning optical system 4 is formed only of the first and second lenses 41 and 42. However, the configuration of the scanning optical system 4 is not limited to the above mentioned configuration. As long as the scanning optical system 4 keeps the arcsine property, carious types of configurations can be employed. For example, the scanning optical system 4 may include an auxiliary optical element, such as, an optical element having a diffracting structure for correcting a chromatic aberration.

This application claims priority of Japanese Patent Applications No. P2006-337757, filed on Dec. 15, 2006. The entire subject matter of the application is incorporated herein by reference.

What is claimed is:

1. A scanning optical system used with a deflection mirror that produces sinusoidal vibrations, comprising:
   a first lens having a positive power; and
   a second lens having a negative power,
   wherein:
   the first lens and the second lens are arranged in this order from a deflection mirror side; and
   the scanning optical system has an arcsine property and satisfies a condition:

$$-1.15 < f1/f2 < -0.70 \quad (1)$$

where f1 (mm) represents a focal length of the first lens, and f2 (mm) represents a focal length of the second lens.

2. The scanning optical system according to claim 1, wherein the scanning optical system satisfies a condition:

$$-8.00 < \frac{r1+r2}{r1-r2} - \frac{65.6D}{f} < -4.00 \quad (2)$$

where r1 (mm) represents a radius of curvature of a first surface of the first lens located on the deflection mirror side, r2 (mm) represents a radius of curvature of a second surface of the first lens located oppositely to the first surface, D (mm) represents a distance from a point at which a laser beam is incident on the deflection mirror to the first surface of the first lens, and f represents a total focal length of the scanning optical system.

3. The scanning optical system according to claim 1, wherein the scanning optical system satisfies a condition:

$$-4.20 < \frac{r3+r4}{r3-r4} < -1.20 \quad (3)$$

where r3 (mm) represents a radius of curvature of a first surface of the second lens located on the deflection mirror side, and r4 (mm) represents a radius of curvature of a second surface of the second lens located oppositely to the first surface.

4. The scanning optical system according to claim 1, wherein the scanning optical system satisfies a condition:

$$0.05 < s/f \leq 0.65 \quad (4)$$

where s (mm) represents a distance between two principal points of the scanning optical system, and f represents a total focal length of the scanning optical system.

5. The scanning optical system according to claim 1, wherein at least one of surfaces of the first lens is an aspherical surface,
   wherein the scanning optical system satisfies a condition:

$$-4.7E-3 < \frac{ASP}{f1 \times \tan^2\omega \times D} < 1.0E-3 \quad (5)$$

where ASP (mm) represents a difference between SAG amounts of surfaces of the first lens, ω (degree) represents an angle of view of a laser beam incident on the first lens, and a notation E means a power of 10 with an exponent specified by a number to the right of E.

6. The scanning optical system according to claim 1, wherein the scanning optical system satisfies a condition:

$$-0.42 < \frac{ASP}{\arcsin^2\omega \times D} < 0.02 \quad (6)$$

where ASP (mm) represents a difference between SAG amounts of surfaces of the first lens, and ω (degree) represents an angle of view of a laser beam incident on the first lens.

7. The scanning optical system according to claim 1, wherein the deflection mirror includes a micromirror.

8. A scanning optical device, comprising:
- a light source unit configured to emit a laser beam while on-off modulating the laser beam in accordance with a modulating signal generated based on image data;
- a deflection mirror that produces sinusoidal vibrations to deflect the laser beam emitted by the light source unit;
- a scanning optical system according to claim 1; and
- a scan target unit configured such that a scan target surface on which the laser beam deflected by the deflection mirror scans in a scanning direction is moved perpendicularly to the scanning direction.

9. The scanning optical device according to claim 8, wherein the deflection mirror includes a micromirror.

* * * * *